(12) United States Patent
Schultz et al.

(10) Patent No.: US 12,736,735 B2
(45) Date of Patent: Sep. 15, 2026

(54) PARALLEL PLATE WAVEGUIDES

(71) Applicant: Vuzix Corporation, West Henrietta, NY (US)

(72) Inventors: Robert J. Schultz, Victor, NY (US); Mitchell G. Knoebel, Webster, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 1243 days.

(21) Appl. No.: 17/432,889

(22) PCT Filed: Feb. 21, 2020

(86) PCT No.: PCT/US2020/019337
§ 371 (c)(1),
(2) Date: Aug. 20, 2021

(87) PCT Pub. No.: WO2020/172610
PCT Pub. Date: Aug. 27, 2020

(65) Prior Publication Data

US 2022/0236472 A1 Jul. 28, 2022

Related U.S. Application Data

(60) Provisional application No. 62/809,366, filed on Feb. 22, 2019.

(51) Int. Cl.
*G02B 27/01* (2006.01)
*F21V 8/00* (2006.01)

(52) U.S. Cl.
CPC ......... *G02B 6/0036* (2013.01); *G02B 6/0016* (2013.01); *G02B 6/0065* (2013.01); *G02B 27/0172* (2013.01)

(58) Field of Classification Search
CPC ......................... G02B 27/0172; G02B 6/0011; G02B 6/0013; G02B 6/0018; G02B 6/0016; G02B 6/0036; G02B 6/36
See application file for complete search history.

(56) References Cited

U.S. PATENT DOCUMENTS 4,637,684 A 1/1987 Tomita et al.
6,270,604 B1 8/2001 McCallion et al.
(Continued)

FOREIGN PATENT DOCUMENTS

CN 104749673 A 7/2015
JP S62-238502 A 10/1987
(Continued)

OTHER PUBLICATIONS

United States Patent & Trademark Office (ISA/US), International Search Report and Written Opinion in International Patent Application No. PCT/US2020/019337, dated Jun. 19, 2020.
(Continued)

*Primary Examiner* — Sharrief I Broome
*Assistant Examiner* — Journey F Sumlar
(74) *Attorney, Agent, or Firm* — Harter Secrest & Emery LLP; Jacob D. Merrill, Esq.

(57) ABSTRACT

A parallel plate waveguide assembly for conveying an image bearing light from an in-coupling optic to an out-coupling optic is disclosed wherein the waveguide assembly includes at least a waveguide blank having a first surface and a second surface located a distance from the first surface to create a thickness of the blank. The waveguide assembly further includes a first coating applied to the first surface forming a third surface and a second coating applied to the second surface forming a fourth surface. The third and fourth surfaces are less than a quarter of a wavelength of an image bearing light beam in flatness.

20 Claims, 8 Drawing Sheets

(56) References Cited

U.S. PATENT DOCUMENTS

| | | | | |
|---|---|---|---|---|
| 7,112,359 | B2 | 9/2006 | Dhar et al. | |
| 9,513,480 | B2 | 12/2016 | Saarikko et al. | |
| 11,333,887 | B2 | 5/2022 | Suzuki et al. | |
| 2003/0044577 | A1 | 3/2003 | Dhar et al. | |
| 2003/0086679 | A1* | 5/2003 | Gao | G02B 6/138 385/130 |
| 2004/0062505 | A1 | 4/2004 | Sugitatsu et al. | |
| 2006/0114564 | A1 | 6/2006 | Sutherland et al. | |
| 2007/0025672 | A1 | 2/2007 | Suzuki et al. | |
| 2008/0254210 | A1 | 10/2008 | Lai et al. | |
| 2010/0118416 | A1 | 5/2010 | Do | |
| 2013/0051730 | A1 | 2/2013 | Travers et al. | |
| 2013/0242392 | A1* | 9/2013 | Amirparviz | G02B 5/3025 359/485.05 |
| 2014/0140654 | A1 | 5/2014 | Brown et al. | |
| 2014/0300966 | A1 | 10/2014 | Travers et al. | |
| 2014/0340920 | A1 | 11/2014 | Bayersdorfer | |
| 2015/0015957 | A1 | 1/2015 | Kawasaki et al. | |
| 2017/0010466 | A1 | 1/2017 | Klug et al. | |
| 2017/0010488 | A1 | 1/2017 | Klug et al. | |
| 2017/0357090 | A1 | 12/2017 | Martinez et al. | |
| 2018/0061139 | A1 | 3/2018 | Rodriguez et al. | |
| 2018/0164645 | A1 | 6/2018 | Oh et al. | |
| 2018/0217305 | A1 | 8/2018 | Valera | |
| 2018/0231783 | A1* | 8/2018 | Weng | G02B 6/0015 |
| 2018/0275409 | A1 | 9/2018 | Gao et al. | |
| 2019/0011708 | A1 | 1/2019 | Schultz et al. | |
| 2020/0192102 | A1 | 6/2020 | Travers | |

FOREIGN PATENT DOCUMENTS

| | | | |
|---|---|---|---|
| JP | 2001166170 | A | 6/2001 |
| JP | 2002-533743 | A | 10/2002 |
| JP | 2006-038962 | A | 2/2006 |
| JP | 2006201014 | A | 8/2006 |
| JP | 2013210419 | A | 10/2013 |
| JP | 2015-096883 | A | 5/2015 |
| JP | 2015-105990 | A | 6/2015 |
| JP | 2015-179297 | A | 10/2015 |
| JP | 2016-206520 | A | 12/2016 |
| JP | 2018-521350 | A | 8/2018 |
| JP | 2018-533108 | A | 11/2018 |
| JP | 2019-020723 | A | 2/2019 |
| KR | 101034667 | B1 | 5/2011 |
| KR | 20180115850 | A | 10/2018 |
| WO | 0037976 | A1 | 6/2000 |
| WO | 2008142809 | A1 | 11/2008 |
| WO | 2017/120320 | A1 | 7/2017 |
| WO | 2018/105750 | A1 | 6/2018 |

OTHER PUBLICATIONS

Elgin (2015) "Selection of Index Matching Materials," PolymerExperts, 5 pages.

* cited by examiner 70
14
54
56
74
52
58
72

70
14
54
56
74
52
58
72
80

70
14
54
56
84
70
G
64
82
74
72
58
52
76

70
14
54
84
70
G
78
82
74
72
58
52
64
76

PARALLEL PLATE WAVEGUIDES

TECHNICAL FIELD

The present disclosure relates generally to parallel plate waveguides for conveying virtual images, and more specifically to the manufacturing of parallel plate waveguides.

BACKGROUND

Head-Mounted Displays (HMDs) are being developed for a range of diverse uses, including military, commercial, industrial, fire-fighting, and entertainment applications. For many of these applications, there is particular value in forming a virtual color image that can be visually superimposed over the real-world image that lies in the field of view of the HMD user. Optically transparent flat parallel plate waveguides, also called planar waveguides, convey image-bearing light generated by a color projector system to the HMD user. The planar waveguides convey the image-bearing light in a narrow space to direct the virtual image to the HMD user's pupil and enable the superposition of the virtual image over the real-world image that lies in the field of view of the HMD user.

In such conventional imaging light guides, collimated, relatively angularly encoded light beams from a color image projector source are coupled into an optically transparent planar waveguide by an input coupling optic, such as an in-coupling diffractive optic, which can be mounted or formed on a surface of the parallel plate planar waveguide or disposed within the waveguide. Such diffractive optics can be formed as diffraction gratings, holographic optical elements, or in other known ways. For example, the diffraction grating can be formed as a surface relief grating. After propagating along the planar waveguide, the diffracted color image-bearing light can be directed back out of the planar waveguide by a similar output grating, which may be arranged to provide pupil expansion along one or more dimensions of the virtual image. In addition, one or more diffractive turning gratings may be positioned along the waveguide optically between the input and output gratings to provide pupil expansion in one or more dimensions of the virtual image. The image-bearing light output from the parallel plate planar waveguide provides an expanded eyebox for the viewer.

A HMD system may consist of at least one image conveying planar waveguide for conveying virtual image encoded light to the left eye of the viewer and at least one image conveying planar waveguide for conveying virtual image encoded light to the right eye of the viewer, thus enabling stereo images to the viewer.

Virtual image reconstruction and virtual image quality of the perceived virtual image depends on the degree to which the planar waveguide surfaces are flat and its opposite surfaces are parallel to one another. Thus, there is need to construct planar waveguides with very high degrees of flatness and opposite surface parallelism.

SUMMARY

The present disclosure provides for a waveguide assembly and method of making same. This advancement in the art of fabricating waveguide assemblies may be utilized, inter alia, in virtual image conveyance and presentation when using compact head-mounted devices and similar imaging apparatus.

In a first exemplary embodiment, a waveguide assembly for conveying an image bearing light from an in-coupling optic to an out-coupling optic includes at least a waveguide blank having a first surface and a second surface located a distance from the first surface to create a thickness of the blank. The waveguide assembly further includes a first coating applied to the first surface forming a third surface and a second coating applied to the second surface forming a fourth surface. The third and fourth surfaces are less than a quarter of a wavelength of an image bearing light beam in flatness.

In a second exemplary embodiment, a method of producing a waveguide assembly includes providing a blank having a first surface and a second surface, and providing a flat surface. The method further includes applying a release agent to the flat surface and applying a coating over the release agent. Additionally, the method includes applying the first surface of the blank to the coating, wherein the first surface is positioned a predetermined distance from the flat surface, and curing the coating, whereby the coating is coupled with the first surface.

In a third exemplary embodiment, a method of producing a waveguide assembly includes providing a blank having a first surface and a second surface, and providing a flat surface. The method further includes applying a release agent to the flat surface, and applying a coating to the first surface of the blank. Additionally, the method includes lowering the flat surface into the coating, wherein the blank first surface is positioned a predetermined distance from the flat surface, and wherein the blank is suspended from the flat surface via the coating. The method also includes curing the coating, whereby the coating is coupled with the blank first surface.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
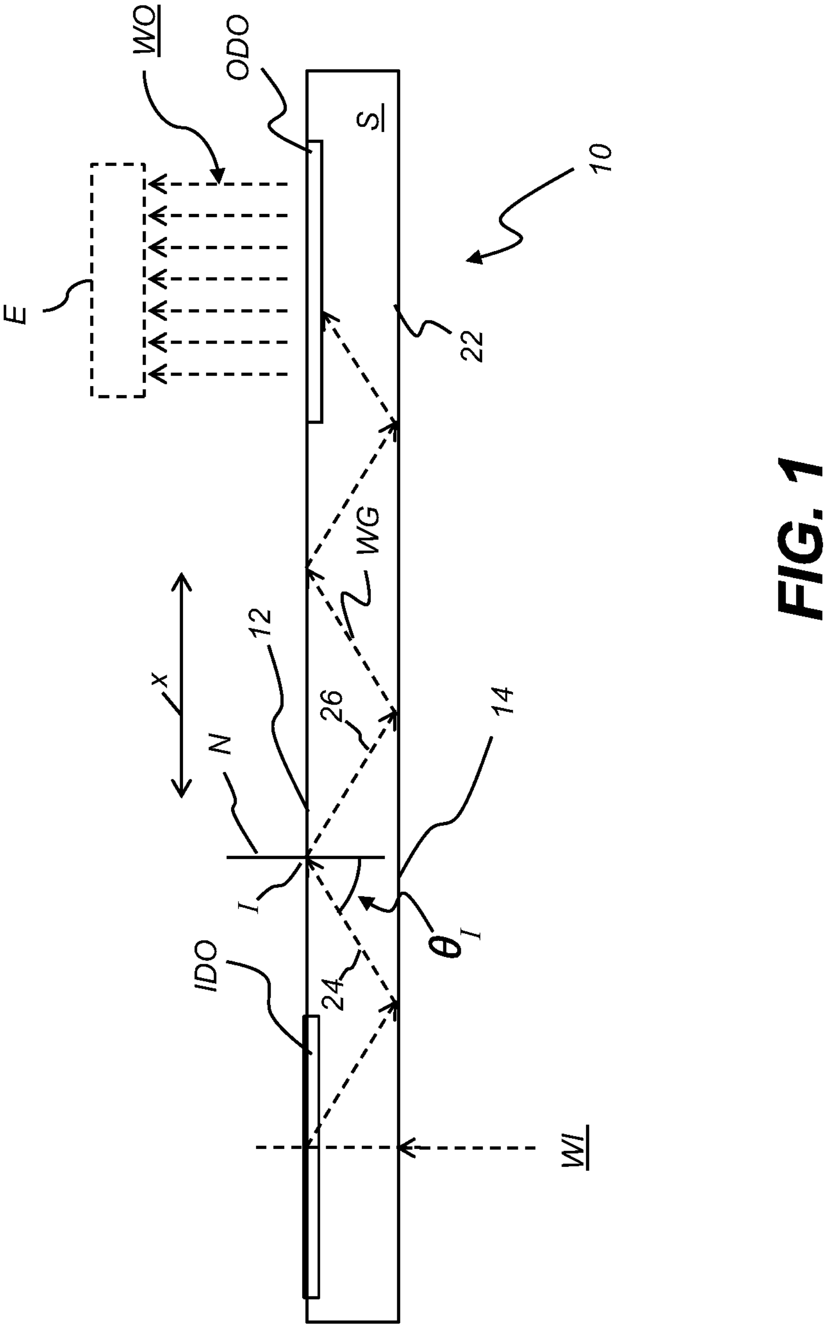
FIG. 1 illustrates a cross-sectional view of an image light guide providing one dimension of pupil expansion according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

The terms "image light guide", "waveguide", "parallel plate waveguide" and "planar waveguide" are considered to be synonymous, and are used interchangeably herein.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

As illustrated in FIG. 1, a monocular type image light guide 10 may include a planar waveguide assembly 22 having a transparent substrate S, plane-parallel inner and outer surfaces 12 and 14, an in-coupling diffractive optic IDO, and an out-coupling diffractive optic ODO. In this example, in-coupling diffractive optic IDO is shown as a reflective type diffraction grating arranged on the inner surface 12 of the planar waveguide assembly 22 opposite to the outer surface 14 of the planar waveguide assembly 22 through which image-bearing light WI approaches the planar waveguide assembly 22. However, in-coupling diffractive optic IDO could alternately be a transmissive diffraction grating, volume hologram or other holographic diffraction element, or other type of optical component that provides diffraction for the incoming, image-bearing light WI. The in-coupling diffractive optic IDO can be located on the inner or outer surface 12, 14 of the planar waveguide assembly 22 and can be of a transmissive or reflective type in a combination that depends upon the direction from which the image-bearing light WI approaches the planar waveguide assembly 22.

When used as a part of a virtual display system, in-coupling diffractive optic IDO couples the image-bearing light WI from a real, virtual or hybrid image source (not shown) into the substrate S of the planar waveguide assembly 22. Any real image or image dimension is first converted, e.g., converged toward a focus, into an array of overlapping angularly related beams corresponding to the different pixels of a virtual image for presentation to the in-coupling diffractive optic IDO. Typically, the rays within each bundle forming one of the angularly related beams extend in parallel, but the angularly related beams are relatively inclined to each other through angles defined in two angular dimensions corresponding to linear dimensions of the image.

The image-bearing light WI is diffracted (generally through a first diffraction order) and is thereby redirected by in-coupling diffractive optic IDO into the planar waveguide assembly 22 as image-bearing light WG for further propagation along the planar waveguide assembly 22 by total internal reflection (TIR). Although diffracted into a different combination of angularly related beams, in keeping with the boundaries set by TIR the image-bearing light WG preserves the image information in an encoded form that is derivable from the parameters of the in-coupling diffractive optic IDO. An out-coupling diffractive optic ODO receives the encoded image-bearing light WG and diffracts (also generally through a first diffraction order) the image-bearing light WG out of the planar waveguide assembly 22 as the image-bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. In addition, the out-coupling diffractive optic ODO can change the original field points' position angular relationships producing an output virtual image focused at a finite distance.

The out-coupling diffractive optic ODO is shown as a transmissive type diffraction grating arranged on the inner surface 12 of the planar waveguide assembly 22. However, like the in-coupling diffractive optic IDO, the out-coupling diffractive optic ODO can be located on the inner or outer surface 12 or 14 of the planar waveguide assembly 22 and be of a transmissive or reflective type in a combination that supports the intended direction through which the image-bearing light WO exits the planar waveguide assembly 22.

To increase one dimension of overlap among the angularly related beams in a so-called eyebox E within which the virtual image can be seen, the out-coupling diffractive optic ODO is arranged to encounter the image-bearing light WG multiple times and to diffract only a portion of the image-bearing light WG upon each encounter. The multiple encounters along the length of the out-coupling diffractive optic ODO have the effect of enlarging one dimension of each of the angularly related beams of the image-bearing light WO thereby expanding one dimension of the eyebox E within which the beams overlap. The expanded eyebox E decreases sensitivity to the position of a viewer's eye for viewing the virtual image.

Figure 2:
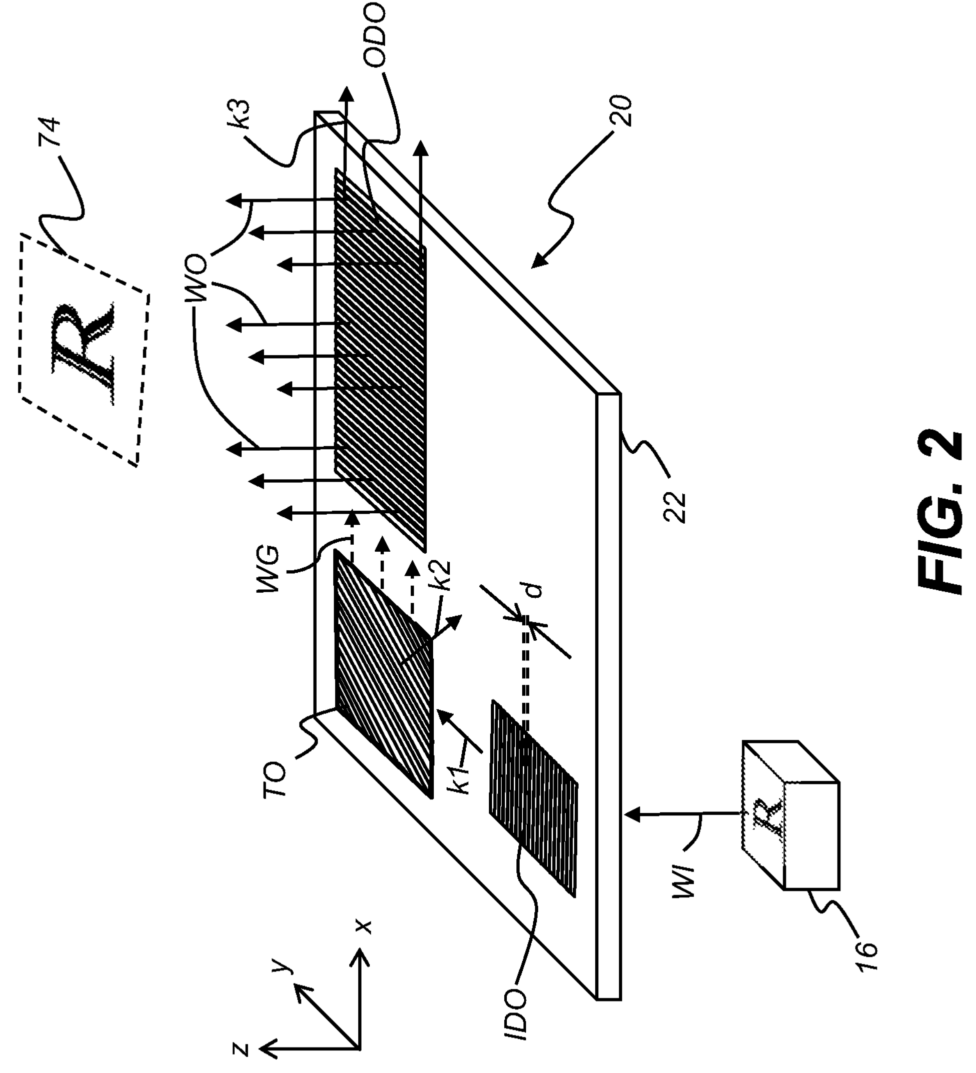
FIG. 2 illustrates a perspective view of an image light guide providing two dimensions of pupil expansion according to an embodiment of the present disclosure.

As illustrated in FIG. 2, in an embodiment, an image light guide 20 is arranged for expanding an eyebox 74 in two dimensions, i.e., along both x- and y-axes of the intended image. To achieve a second dimension of beam expansion, the in-coupling diffractive optic IDO is oriented to diffract the image-bearing light WI about a grating vector k1 toward an intermediate diffractive optic. In an embodiment, the intermediate diffractive optic may be a turning optic TO, whose grating vector k2 is oriented to diffract the image-bearing light WG in a reflective mode toward the out-coupling diffractive optic ODO. Only a portion of the image-bearing light WG is diffracted by each of multiple encounters with the turning optic TO, thereby laterally expanding each of the angularly related beams of the image-bearing light WG approaching the out-coupling diffractive optic ODO. The turning optic TO redirects the image-bearing light WG into a direction toward the out-coupling diffractive optic ODO with a grating vector k3 for longitudinally expanding the angularly related beams of the image-bearing light WG in a second dimension before exiting the planar waveguide 22 as the image-bearing light WO. Grating vectors, such as the depicted grating vectors k1, k2, and k3, are in a plane parallel to the planar waveguide 22 and point in a direction that is normal to the diffractive features (e.g., grooves, lines, or rulings) of the diffractive optics and have a magnitude inversely proportional to the period or pitch d (i.e., the on-center distance between grooves) of the diffractive optics IDO, TO, and ODO.

In an embodiment, as illustrated in FIG. 2, in-coupling diffractive optic IDO of the image light guide 20 receives the incoming image-bearing light WI containing a set of angularly related beams corresponding to individual pixels or equivalent locations within an image generated by an image source 16. A full range of angularly encoded beams for producing a virtual image can be generated by a real display together with focusing optics, by a beam scanner for more directly setting the angles of the beams, or by a combination such as a one-dimensional real display used with a one-dimensional scanner. The image light guide 20 outputs a laterally expanded set of angularly related beams in two dimensions of the image by providing multiple encounters of the image-bearing light WG with both the turning optic TO and the out-coupling diffractive optic ODO in different orientations. In the original orientation of the planar waveguide assembly 22, the turning optic TO provides beam expansion in the y-axis direction, and the out-coupling diffractive optic ODO provides a similar beam expansion in the x-axis direction. The reflectivity characteristics and respective periods d of the two diffractive optics IDO and ODO and the turning optic TO, together with the orientations of their respective grating vectors, provide for beam expansion in two dimensions while substantially preserving the intended relationships among the angularly related beams of the image-bearing light WI that are output from the image light guide 20 as the image-bearing light WO.

While the image-bearing light WI input into the image light guide 20 is encoded into a different set of angularly related beams by the in-coupling diffractive optic IDO, the information required to reconstruct the image can be substantially preserved by accounting for the systematic effects of the in-coupling diffractive optic IDO. The turning optic TO, located in an intermediate position between the in-coupling and out-coupling diffractive optics IDO, ODO, can be arranged so that it does not induce significant changes to the encoding of the image-bearing light WG. As such, the out-coupling diffractive optic ODO can be arranged in a symmetric fashion with respect to the in-coupling diffractive optic IDO. In an embodiment, the out-coupling diffractive optic ODO may include diffractive features sharing the same period as the diffractive features of the in-coupling diffractive optic IDO. Similarly, in an embodiment, the period of the turning optic TO can also match the common period of the in-coupling and out-coupling diffractive optics IDO and ODO.

In an embodiment, as illustrated in FIG. 2, the grating vector k2 of the turning optic TO may be oriented at 45 degrees with respect to the other grating vectors. In another embodiment, the turning optic grating vector k2 can be oriented at 60 degrees to the grating vectors k1 and k3 of the in-coupling and out-coupling diffractive optics IDO, ODO in such a way that the image-bearing light WG is turned 120 degrees. By orienting the turning optic grating vector k2 at 60 degrees with respect to the grating vectors k1 and k3 of the in-coupling and out-coupling diffractive optics IDO, ODO, the grating vectors k1 and k3 are also oriented at 60 degrees with respect to each other. Basing the grating vector magnitudes on the common pitch shared by the turning optic TO and the in-coupling and out-coupling diffractive optics IDO and ODO, the three grating vectors k1, k2, and k3 (as directed line segments) form an equilateral triangle, and sum to a zero-vector magnitude, which avoids asymmetric effects that could introduce unwanted aberrations including chromatic dispersion.

The image-bearing light WI that is diffracted into the planar waveguide assembly 22 is effectively encoded by the in-coupling optic. In other embodiments, the in-coupling optic may comprise, but is not limited to, gratings, holograms, prisms, or mirrors. Any reflection, refraction, and/or diffraction of light that takes place at the input must be correspondingly decoded by the out-coupling optic to reform the virtual image that is presented to the viewer. The turning optic TO, placed at an intermediate position between the in-coupling and out-coupling diffractive optics IDO, ODO, can be designed and oriented so that it does not induce any substantial change on the encoded light. Out-coupling diffractive optic ODO decodes the image-bearing light WG into its original or desired form of angularly related beams that have been expanded to fill the eyebox 74. Whether any symmetries are maintained among the turning optic TO and the in-coupling and out-coupling diffractive optics IDO, ODO, or whether any change to the encoding of the angularly related beams of the image-bearing light WI takes place along the planar waveguide 22, the turning optic TO and the in-coupling and out-coupling diffractive optics IDO, ODO may be related so that the image-bearing light WO that is output from the planar waveguide assembly 22 preserves or otherwise maintains the original or desired form of the image-bearing light WI for producing the intended virtual image with the overlapping image bearing light beams WO.

With continued reference to FIG. 2, the letter "R" represents the orientation of the virtual image that is visible to the viewer whose eye is in the eyebox 74. As shown, the orientation of the letter "R" in the represented virtual image matches the orientation of the letter "R" as encoded by the image-bearing light WI. A change in the rotation about the z-axis or angular orientation of incoming image-bearing light WI with respect to the x-y plane causes a corresponding symmetric change in rotation or angular orientation of outgoing light WO from out-coupling diffractive optic ODO. From the aspect of image orientation, the turning optic TO can act as a type of optical relay, providing expansion of the angularly encoded beams of the image-bearing light WG along one axis (e.g., along the y-axis) of the image. Out-coupling diffractive optic ODO further expands the angularly encoded beams of the image-bearing light WG along another axis (e.g., along the x-axis) of the image while maintaining the original orientation of the virtual image encoded by the image-bearing light WI. Like the in-coupling and out-coupling diffractive optics IDO, ODO, the turning optic TO may take several forms. In an embodiment, the turning optic TO may be a slanted grating. In another embodiment, the turning optic TO may be a square grating. In another embodiment, the turning optic TO may be a blazed grating. In any embodiment of the turning optic TO, the turning optic TO may be arranged on the inner or outer surfaces of the planar waveguide 22.

The image light guide 20 depicted in FIG. 2 may be of a type used in a HMD for providing image content to a viewer. The image light guide 20 is also particularly well suited to augmented reality applications in which virtual image content can be superimposed on a real-world view as seen through the transparent planar waveguide assembly 22.

As described above, the image-bearing light WI is encoded by the in-coupling optic IDO as image-bearing light WG that is further propagated along the planar waveguide assembly 22 by total internal reflection (TIR). If the surfaces of the planar waveguide assembly 22 are not flat and/or are not parallel to one another, the encoded image-bearing light WG degrades at each TIR at the surfaces 12, 14. When image-bearing light WG is decoded and exits the planar waveguide assembly 22 by out-coupling optic ODO, to become image-bearing light WO, the degradation of the encoded image-bearing light WG may cause the image quality of the resulting virtual image to be significantly degraded. To reduce this degradation of the virtual image quality, the planar waveguide assembly 22 may be composed of several layers.

Figures 3A, 3B, 3C:
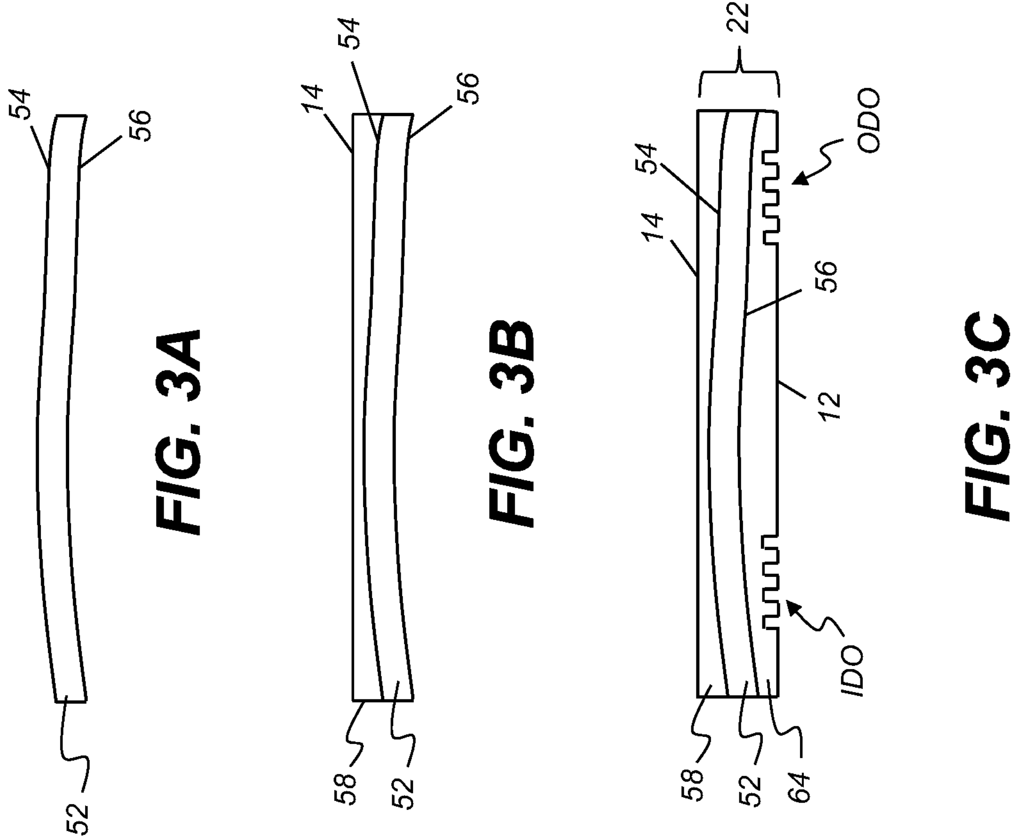
FIG. 3A illustrates a side view of a waveguide blank having non-flat face surfaces.
FIG. 3B illustrates a side view of a waveguide blank having one face surface coated according to an embodiment of the present disclosure.
FIG. 3C illustrates a side view of a waveguide blank having two face surfaces coated and a diffractive optic on one of the outer surfaces according to an embodiment of the present disclosure.
Figures 4A, 4B:
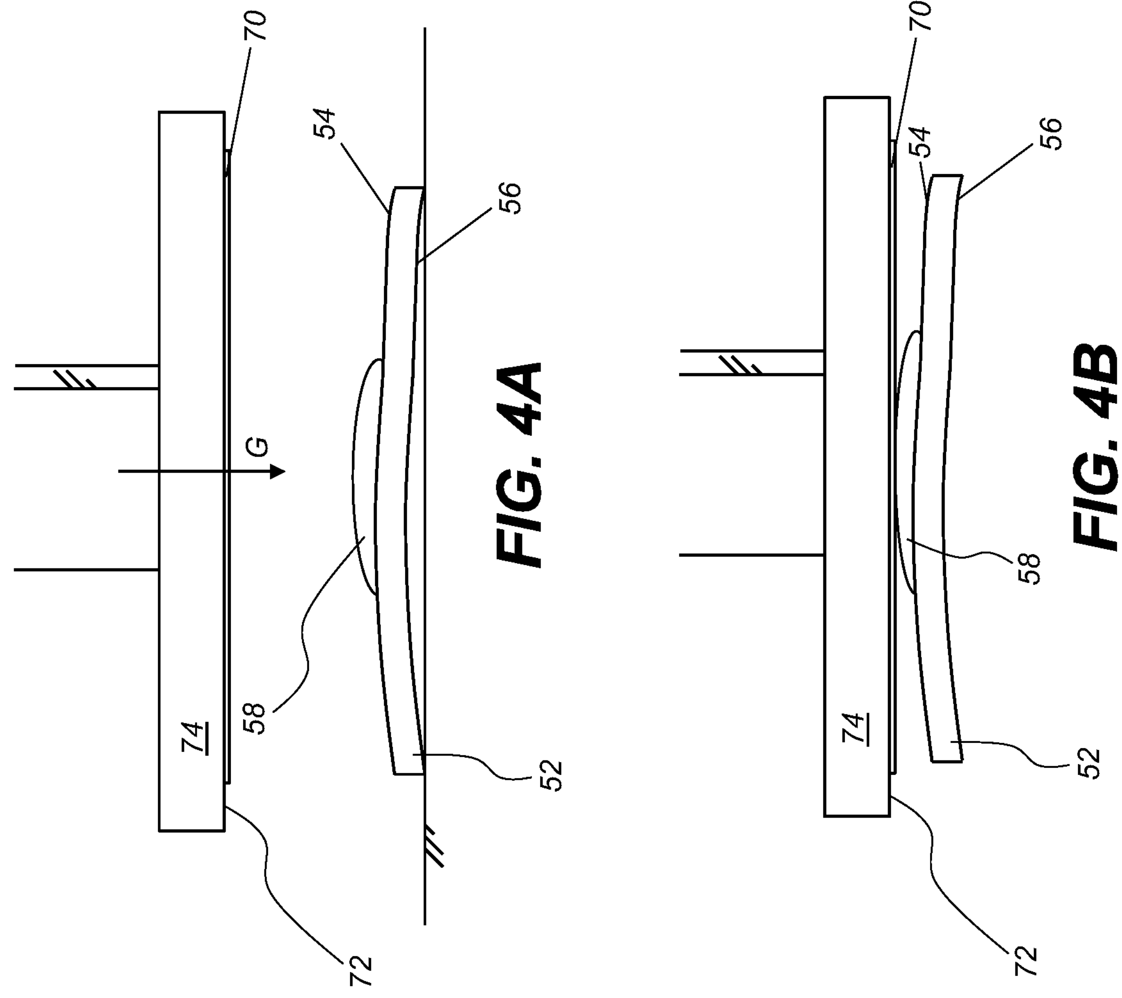
FIGS. 4A-C illustrate a side view of a waveguide blank having a surface coated according to an embodiment of the present disclosure.
Figures 4C, 4D:
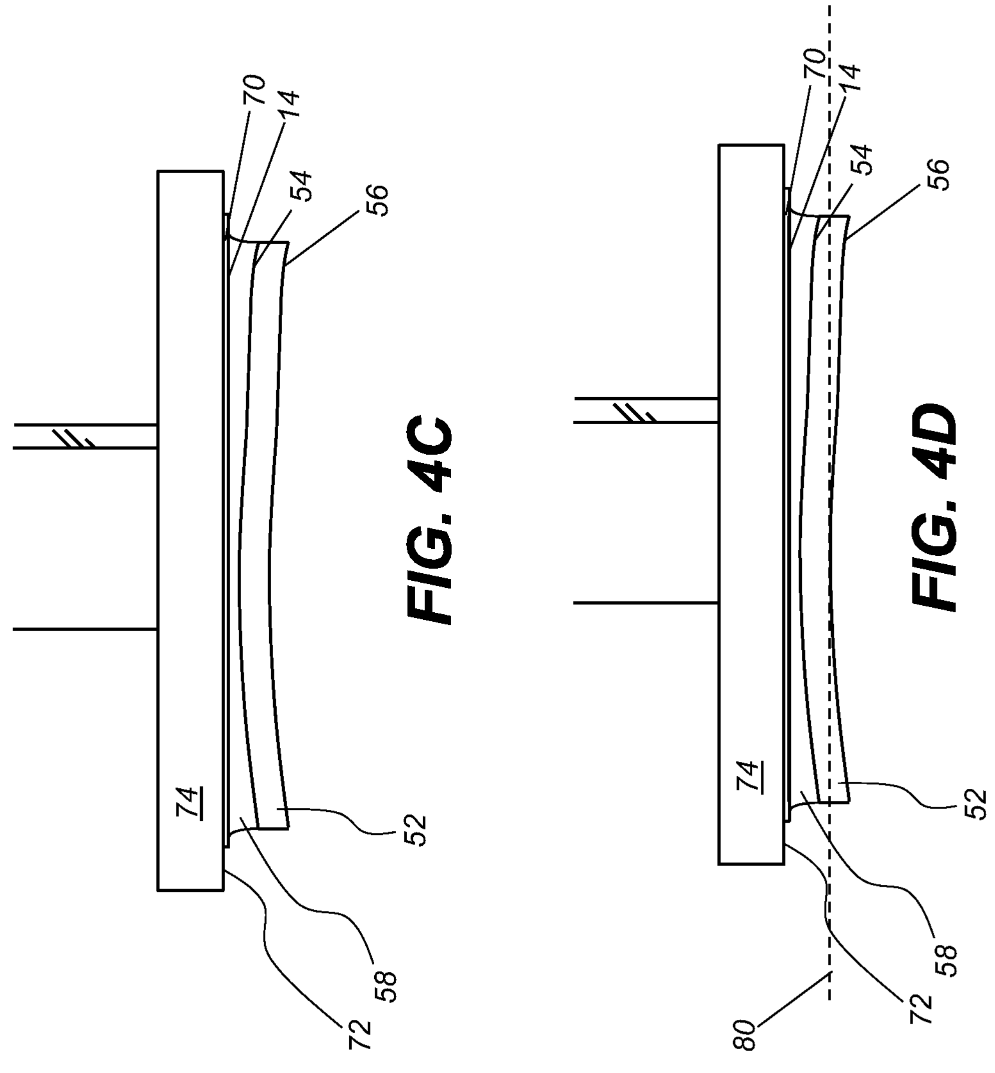
FIG. 4D illustrates a side view of a waveguide blank having a surface coated according to an embodiment of the present disclosure.

As illustrated in FIG. 3A, in an embodiment, a waveguide blank 52 may include a first surface 54 and a second surface 56. In an embodiment, the waveguide blank 52 is a polished optically transparent substrate. As illustrated in FIG. 3A, the first surface 54 and the second surface 56 may not be flat and may not be parallel to each other. In an embodiment, the thickness of the waveguide blank 52 may be within the range of 0.5 to 2.5 mm thick. The waveguide blank 52 may be formed of, but is not limited to, a material such as a glass or a polymer. In an embodiment, the index of refraction of the waveguide blank 52 may be within the range 1.5 to 2.0. Using the potentially non-flat, non-parallel, waveguide blank 52 as the planar waveguide assembly would result in significant degradation of the virtual image produced due to the angular error aggregated in successive TIR's in conveying the encoded image WG through the planar waveguide assembly 22. That is, non-flat and/or non-parallel surfaces 54, 56 of the waveguide 22 will degrade the encoding of the image-bearing light WG at each TIR interaction of the image-bearing light WG with the waveguide's surfaces 54, 56.

As waveguide blanks 52 get thinner, the tendency is for the waveguide blank surfaces 54, 56 to be either parallel or flat, but not both. A high pressure imprinting method may be utilized for the creation of the in-coupling optic IDO and out-coupling optic ODO. However, the high pressure imprinting method deforms the waveguide blank 52 while attempting to produce a flat imprinted layer on the first surface 54. In addition, the conventional high pressure imprinting method applies a thin, uniform, imprinted layer, to only one surface 54, 56 of the waveguide blank 52, allowing the waveguide blank 52 to revert to its original—uneven—shape.

As illustrated in FIGS. 4A-6C, a low pressure imprinted method may instead be used to create the in-coupling and out-coupling optics IDO, ODO on one or both waveguide blank surfaces 54, 56. A low pressure imprinted layer 58 may be applied to the first surface 54 of the waveguide blank 52 to fill the voids and remove the optical power of the first surface 54. Then the waveguide blank 52 having the imprinted layer 58 may receive a low pressure imprinted layer 64 (see also FIG. 3C) applied to the waveguide blank surface 56 to create a flat, parallel surfaced, waveguide assembly 22. Diffraction gratings can be included in either, both, or neither of the imprinted layers 58, 64.

As illustrated in FIG. 3B, in an embodiment, a low pressure imprinted layer 58 may be an index matching coating and may be applied to first surface 54 of the waveguide blank 52. The index matching coating 58 approximately matches the index of refraction of the waveguide blank 52. In an embodiment, the index of refraction of the index matching coating 58 may be within 5% of the index of refraction of the waveguide blank 52. The face surface 14 of the index matching coating 58 is flat to within a quarter (¼) of the wavelength of the image bearing light transmitted through the waveguide. In an embodiment, the index matching coating face surface 14 may be flat to within 532 nm. In an embodiment, the index matching coating face surface 14 may have a surface deviation of, or less than, 0.15 microns between the in-coupling diffractive optic IDO and the out-coupling diffractive optic ODO. Additionally, in an embodiment, the index matching coating face surface 14 may have a flatness specification between 450 nm/4 to 650 nm/4. Further, in an embodiment, the index matching coating 58 may be an ultraviolet light ("UV") cured epoxy or other transparent material. For example, the index matching coating 58 may be, but is not limited to, a Norland Optical Adhesive (NOA), a LumipluS® transparent resin, a polymer layer, or similar product.

As illustrated in FIG. 3C, in an embodiment of the low pressure imprinting method, the waveguide blank 52 may have the index matching coating 58 applied to the first surface 54, and a low pressure imprinted layer 64 may be applied to the second surface 56. The low pressure imprinted layer 64 may be an index matching coating 64. In an embodiment, the index of refraction of the index matching coatings 58, 64 may be within 1% of the index of refraction of the waveguide blank 52. In another embodiment, the index of refraction of the index matching coatings 58, 64 may be within 0.5% of the index of refraction of the waveguide blank 52. The face surface 12 of the index matching coating 64 may be flat to within ¼ of the wavelength used with the waveguide. In an embodiment, the index matching coating face surface 12 may be flat to within 532 nm. In another embodiment, the index matching coating surface 12 may include surface deviation of less than 0.15 microns between the in-coupling diffractive optic IDO and the out-coupling diffractive optic ODO. Index matching coating 64 may also be a UV cured epoxy. For example, the index matching coating 64 may be, but is not limited to, a Norland Optical Adhesive (NOA), a polymer layer, or a LumipluS® transparent resin. In an embodiment, the face surface 12 may be less than 6 arcseconds of deviation from parallel to the face surface 14.

In an embodiment, diffractive optical elements IDO, ODO, TO may be imprinted onto or into the index matching coating 58. In an embodiment, as illustrated in FIG. 3C, diffractive optical elements IDO, ODO, TO may be imprinted onto or into the index matching coating 64. In another embodiment, no diffractive optical elements are imprinted onto or into the index matching coatings 58, 64.

In an embodiment, the index matching coating 64 may be an emulsion suitable for recording holograms. Thus, the in-coupling optic IDO may be an embedded holographic optical element suitable for in-coupling the incident image-bearing light WI.

Waveguide blank 52 may be an assembly comprising embedded diffractive optical elements and/or one or more beam splitters, or one or more volume holograms, and/or a holographically formed polymer-dispersed liquid crystal (HPDLC) or other known structures for in-coupling incident image-bearing light WI and out-coupling image-bearing light WG. In such configurations, the index matching coatings 58, 64 may not have any additional diffractive elements formed therein or thereon.

In an embodiment, as illustrated in FIGS. 4A-4D a low pressure imprinting method of fabricating the waveguide assembly 22 may include (1) applying a release agent 70 to a downward facing flat surface 72 of a surface plate 74. The surface plate 74 is suspended or oriented such that the flat surface 72 is disposed parallel with the ground. In other words, the flat surface 72 is disposed perpendicular to a gravitational force vector G acting on the surface plate 74. In an embodiment, the release agent 70 is a Fluorosilane material. In an embodiment, the surface plate 74 comprises a block thicker than the waveguide blank 52 such that the size of the surface plate 74 provides stability during fabrication of the waveguide assembly 22. In an embodiment, the surface plate flat surface 72 may have a flatness of $\lambda/4$ at 532 nm.

Fabrication of the waveguide assembly 22 may also include (2) applying an amount of index matching coating 58 to the waveguide blank first surface 54. The waveguide blank first surface 54 is facing upward and is disposed generally parallel with the ground. In an embodiment, the waveguide blank 52 may initially be located on a work table or surface. The surface plate 74 having the release agent 70 applied thereto is then (3) lowered into the index matching coating 58 applied to the waveguide blank first surface 54, (4) and the waveguide blank first surface 54 may be positioned a predetermined distance from the flat surface 72. In an embodiment, positioning the waveguide blank first surface 54 the predetermined distance from the flat surface 72 may additionally include (5) measuring the distance of the waveguide blank first surface 54 to the flat surface 72. The surface plate 74 having the waveguide blank 52 coupled therewith via the index matching coating 58 is then raised such that the waveguide blank 52 is supported from the surface plate 74 via only the index matching coating 58. Capillary forces draw the index matching coating 58 to the peripheral edges of the waveguide blank first surface 54. (6) The index matching coating 58 may then be cured. In an embodiment, the index matching coating 58 is cured via UV light. Fabrication of the waveguide assembly 22 may further include (7) removing the waveguide blank 52, now with the index matching coating 58 attached thereto, from the flat surface 72.

In an embodiment, before the index matching coating 58 is cured, the waveguide blank 52 coupled with the surface plate 74 via the index matching coating 58 may be (8) lowered into a liquid 80 having a predetermined viscosity and buoyancy to further level the waveguide blank 52 relative to the surface plate flat surface 72. In an embodiment, the liquid 80 may be water.

Figures 5A, 5B:
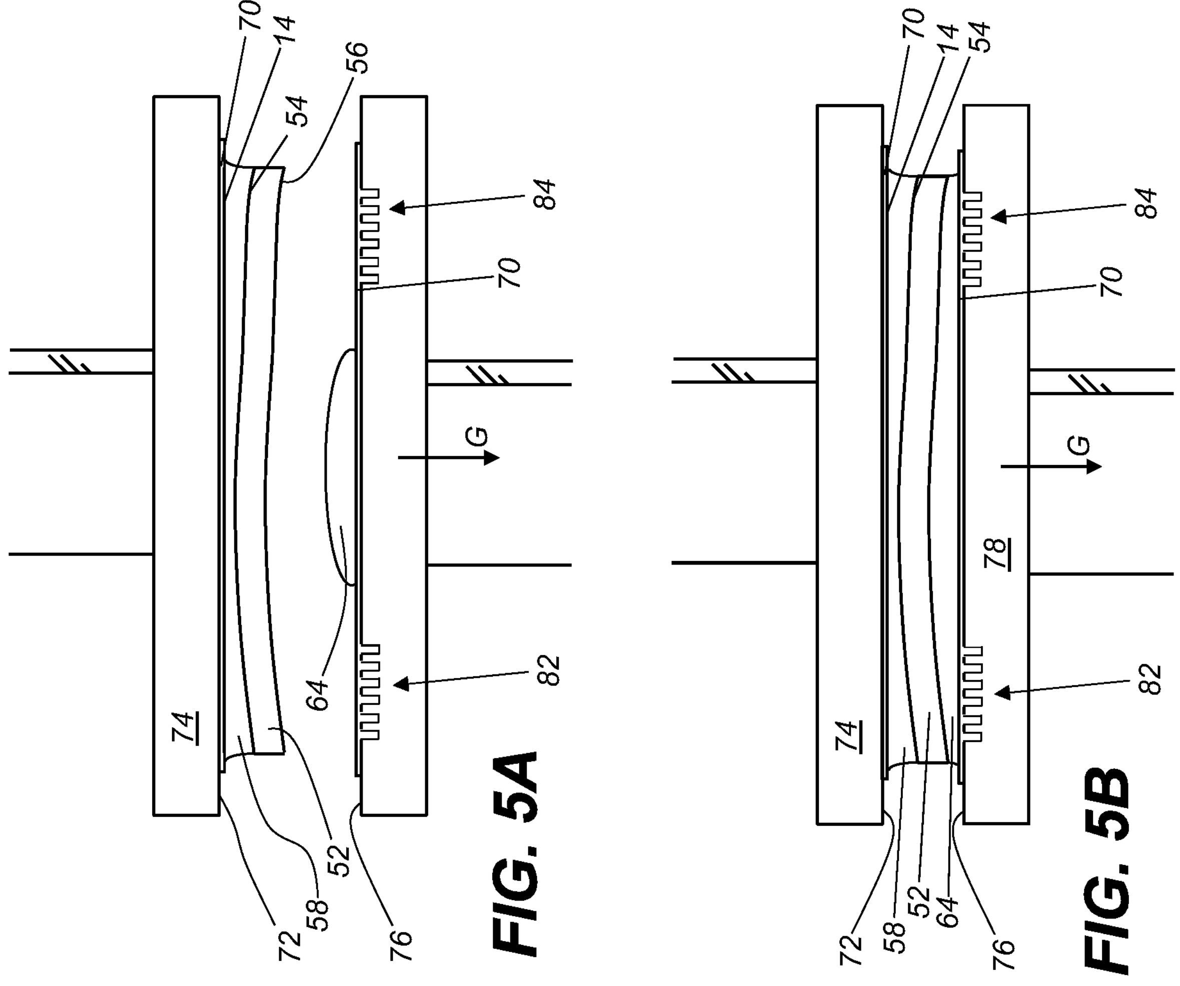
FIGS. 5A-5B illustrate a cross-sectional view of a waveguide blank having a surface coated according to an embodiment of the present disclosure.

In an embodiment, as illustrated in FIGS. 5A & 5B, the method of fabricating the waveguide assembly 22 may include providing an upward facing flat surface 76 of a surface plate 78. The surface plate 78 is positioned or oriented such that the flat surface 76 is disposed parallel with the ground and the flat surface 72. In an embodiment, the surface plate upward facing flat surface 76 may comprise one or more diffraction grating patterns 82, 84

(9) More of the release agent 70 is applied to the flat surface 76, and an amount of index matching coating 64 is applied over the release agent 70. The waveguide blank second surface 56 may be applied to the index matching coating 64, or vice versa, and the waveguide blank second surface 56 may be positioned a distance from the flat surface 76. Optionally, the distance of the waveguide blank second surface 56 to the flat surface 76 may be measured to ensure the desired thickness of the index matching coating 64 is applied to the waveguide blank 52. The index matching coating 64 may then be cured. Fabrication of the waveguide assembly 22 may further include removing the waveguide blank 52 from the flat surfaces 72, 76, now with the index matching coatings 58, 64 attached to the first and second face surfaces 54, 56 of the waveguide blank 52.

Figures 6A, 6B:
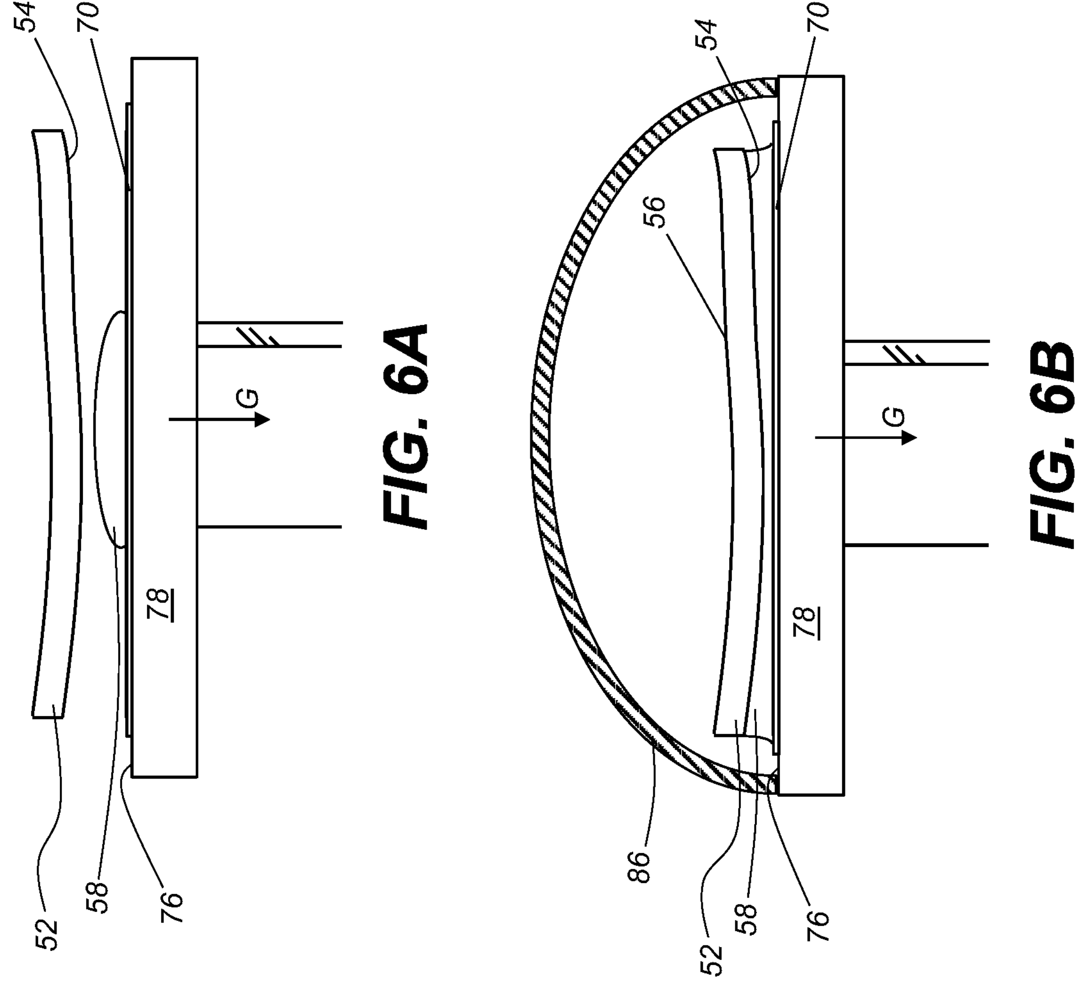
FIGS. 6A-C illustrate a side view of a waveguide blank having two surfaces coated according to an embodiment of the present disclosure.
Figure 6C:
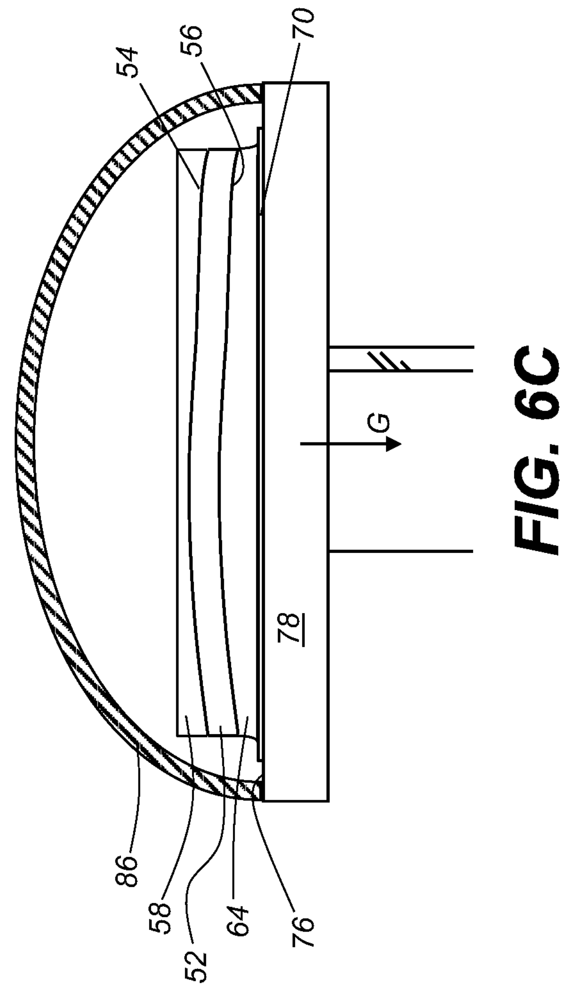

In another embodiment, as illustrated in FIGS. 6A & 6C, the method of fabricating the waveguide assembly 22 may include providing the surface plate 78 having upward facing flat surface 76. The release agent 70 is applied to the flat surface 76, and an amount of index matching coating 58 is applied over the release agent 70. The waveguide blank first surface 54 may be applied to the index matching coating 58, or vice versa, and the waveguide blank first surface 54 may be positioned a distance from the flat surface 76. Optionally, the distance of the waveguide blank first surface 54 to the flat surface 76 may be measured to ensure the desired thickness of the index matching coating 58 is applied to the waveguide blank 52.

In an embodiment, before the index matching coating 58 is cured, the waveguide blank 52 coupled with the surface plate 76 via the index matching coating 58 may be located within a vacuum chamber 86 and subjected to a vacuum or partial vacuum to further level the waveguide blank 52 relative to the surface plate flat surface 76. The index matching coating 58 may then be cured, for example, via exposure to ultraviolet light. As illustrated in FIG. 6C, the vacuum or partial vacuum within the vacuum chamber 86 may then be released, the waveguide blank 52 may be flipped, and the process of applying the index matching coating 64 to the second surface 56 may be performed in the same manner.

In an embodiment, one or more of the surface plates 74, 78 may comprise a rotating device operable to spin the waveguide blank 52. After coupling the waveguide blank first or second first surface 54, 56 to either surface plate flat surface 72, 76 via the index matching coating 58, 64, the waveguide blank 52 may be spun via the surface plate 74, 78 such that the deposited index matching coating 58, 64 spreads uniformly over the first surface 54, 56. As described above, the index matching coating 58, 64 may then be measured (e.g., for desired thickness) and/or cured, and then the index matching coating 58, 64 may be similarly applied to the opposite first surface 54, 56 of the waveguide blank 52.

Advantageously, the present disclosure provides an optical planar waveguide having opposite face surfaces that are flat and parallel to one another to a higher degree than previously obtained with conventional manufacturing of planar waveguides. This allows for presentation of higher quality virtual images to the viewer.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A waveguide assembly, comprising:

a blank having a first surface and a second surface, wherein said second surface is located a distance from said first surface to create a thickness of said blank, and wherein said first and second surfaces are not flat or are not parallel to each other;

a first coating coupled with said first surface, wherein said first coating forms a first outermost surface of said waveguide assembly;

a second coating coupled with said second surface, wherein said second coating forms a second outermost surface of said waveguide assembly;

one or more diffraction gratings disposed in at least one of said first outermost surface and said second outermost surface, and wherein said first coating and said second coating are configured to increase parallelism of said first and second outermost surfaces of said waveguide assembly.

2. The waveguide assembly according to claim 1, wherein said first outermost surface is less than six arcseconds of deviation from parallel to said second outermost surface.

3. The waveguide assembly according to claim 1, wherein said first and second coatings comprise an optical adhesive.

4. The waveguide assembly according to claim 3, wherein said first optical adhesive comprises an index matching optical epoxy having an index of refraction within 5% of an index of refraction of said blank.

5. The waveguide assembly according to claim 1, wherein said one or more diffraction gratings comprise:

an in-coupling diffractive optic imprinted in at least one of said first coating and said second coating, wherein said in-coupling diffractive optic is configured to diffract image-bearing light beams into said waveguide assembly in an angularly encoded form; and an out-coupling diffractive optic imprinted in at least one of said first coating and said second coating, wherein said out-coupling diffractive optic is configured to diffract said image-bearing light beams from said waveguide assembly in an angularly decoded form.

6. A method of producing a waveguide assembly, comprising:

providing a blank having a first surface and a second surface, wherein said first and second surfaces are not flat or are not parallel to each other;

providing a surface plate having a flat surface;

applying a release agent to said flat surface;

applying a coating over said release agent;

moving said first surface of said blank to said coating, wherein said first surface is positioned a predetermined distance from said flat surface;

curing said coating, whereby said coating is coupled with said first surface, wherein said coating forms an outermost surface of said waveguide assembly, and wherein one or more diffraction gratings are disposed in said outermost surface.

7. The method of producing a waveguide assembly according to claim 6, further comprising measuring said distance between said blank and said flat surface.

8. The method of producing a waveguide assembly according to claim 6, wherein said coating is a first coating, further comprising:

removing said blank from said flat surface;

applying said release agent to said flat surface;

applying a second coating over said release agent;

applying said second surface of said blank to said second coating, wherein said second surface is positioned a predetermined distance from said flat surface; and curing said second coating, whereby said second coating is coupled with said second surface.

9. The method of producing a waveguide assembly according to claim 8, wherein said first coating comprises a first index of refraction and said second coating comprises a second index of refraction.

10. The method of producing a waveguide assembly according to claim 8, wherein said first index of refraction is equal to said second index of refraction.

11. The method of producing a waveguide assembly according to claim 8, wherein said first and second coatings comprise an optical adhesive.

12. The method of producing a waveguide assembly according to claim 8, wherein said second coating forms a second outermost surface of said waveguide assembly, and wherein one or more diffraction gratings are disposed in said second outermost surface.

13. The method of producing a waveguide assembly according to claim 6, further comprising rotating said flat surface whereby said coating is evenly dispersed over said first surface of said blank prior to curing said coating.

14. The method of producing a waveguide assembly according to claim 6, further comprising subjecting said blank to at least a partial vacuum whereby said blank first surface is positioned closer to parallel with said flat surface prior to curing said coating.

15. A method of producing a waveguide assembly, comprising:

providing a blank having a first surface and a second surface;

providing a surface plate having a flat surface;

applying a release agent to said flat surface;

applying a coating to said blank first surface;

lowering said flat surface into said coating, wherein said blank first surface is positioned a predetermined distance from said flat surface;

wherein said blank is suspended from said flat surface via said coating; and curing said coating, whereby said coating is coupled with said blank first surface, and wherein said coating forms an outermost surface of said waveguide assembly.

16. The method of producing a waveguide assembly according to claim 15, further comprising lowering said blank at least partially into a liquid prior to curing said coating.

17. The method of producing a waveguide assembly according to claim 15, wherein capillary forces draw said coating to a peripheral edge of said first surface of said blank.

18. The method of producing a waveguide assembly according to claim 15, wherein said coating is a first coating, further comprising:

providing a second flat surface facing said blank second surface;

applying said release agent to said second flat surface;

applying a second coating over said release agent;

applying said blank second surface to said second coating, wherein said blank second surface is positioned a predetermined distance from said second flat surface; and curing said second coating, whereby said second coating is coupled with said blank second surface.

19. A method of producing a waveguide assembly, comprising:

providing a blank having a first surface and a second surface, wherein said first and second surfaces are not flat or are not parallel to each other;

providing a surface plate having a flat surface;

applying a release agent to said flat surface;

applying a coating over said release agent;

applying said first surface of said blank to said coating; and curing said coating, whereby said coating is coupled with said first surface.

20. The method of producing a waveguide assembly according to claim 19, wherein said coating forms an outermost surface of said waveguide assembly, and wherein one or more diffraction gratings are disposed in said outermost surface.

* * * * *